United States Patent
Hirose et al.

(10) Patent No.: US 8,776,966 B2
(45) Date of Patent: Jul. 15, 2014

(54) HYDRAULIC BRAKE LEVER APPARATUS

(75) Inventors: Kazuyuki Hirose, Osaka (JP); Shinichi Takizawa, Osaka (JP)

(73) Assignee: Shimano Inc., Osaka (JP)

( * ) Notice: Subject to any disclaimer, the term of this patent is extended or adjusted under 35 U.S.C. 154(b) by 271 days.

(21) Appl. No.: 12/961,614

(22) Filed: Dec. 7, 2010

(65) Prior Publication Data

US 2011/0240426 A1 Oct. 6, 2011

(30) Foreign Application Priority Data

Mar. 30, 2010 (TW) .............................. 99205557 U

(51) Int. Cl.
*B60T 11/00* (2006.01)

(52) U.S. Cl.
USPC ........................................................ 188/344

(58) Field of Classification Search
CPC ....... B60T 11/22; B60T 11/16; B60T 11/165; B60T 7/102; B62L 3/023
USPC ......... 188/24.22, 152, 344; 60/594, 585, 588, 60/592
See application file for complete search history.

(56) References Cited

U.S. PATENT DOCUMENTS

| | | | | |
|---|---|---|---|---|
| 4,162,616 A * | 7/1979 | Hayashida | ...................... | 60/533 |
| 4,176,886 A * | 12/1979 | Watanabe | ................... | 303/9.64 |
| 4,924,673 A * | 5/1990 | Barker et al. | .................... | 60/589 |
| 5,033,267 A * | 7/1991 | Keane | .............................. | 60/594 |
| 5,050,381 A * | 9/1991 | Matsuno et al. | ................ | 60/584 |
| 5,063,743 A * | 11/1991 | Mori et al. | ....................... | 60/562 |
| 6,003,639 A * | 12/1999 | Buckley et al. | ................. | 188/26 |
| 7,137,492 B2 * | 11/2006 | Laghi | ............................ | 188/344 |
| 7,204,350 B2 * | 4/2007 | Lumpkin | ................... | 188/24.14 |
| 7,389,642 B2 * | 6/2008 | Takizawa et al. | ............. | 60/547.1 |
| 7,497,309 B2 * | 3/2009 | Chen | ............................ | 188/344 |
| 7,500,545 B2 | 3/2009 | Matsushita et al. | | |
| 7,546,909 B2 * | 6/2009 | Campbell et al. | ........... | 188/24.22 |
| 7,578,375 B2 * | 8/2009 | Lin et al. | ........................ | 188/344 |
| 2009/0152062 A1 * | 6/2009 | Tsai | ............................ | 188/344 |
| 2010/0224740 A1 | 9/2010 | Hirose et al. | | |

* cited by examiner

*Primary Examiner* — Bradley King
*Assistant Examiner* — Stephen Bowes
(74) *Attorney, Agent, or Firm* — Global IP Counselors

(57) ABSTRACT

A hydraulic brake lever apparatus is provided with a brake lever housing, a piston, a mounting structure, a brake lever and a fluid reservoir. The brake lever housing includes a cylinder having the piston movably disposed within the cylinder. The mounting structure mounts the brake lever housing to a bicycle handlebar. The brake lever pivotally is mounted to the brake lever housing and moves the piston within the cylinder in response to pivotal movement of the brake lever relative to the brake lever housing. The fluid reservoir fluidly communicates with the cylinder via a port that communicates hydraulic fluid therebetween. The fluid reservoir has a cylindrical shape and lies in a side by side relationship with the cylinder to prevent gas bubbles that have moves from the cylinder to the fluid reservoir via the port from flowing back to the cylinder.

10 Claims, 3 Drawing Sheets

US 8,776,966 B2

HYDRAULIC BRAKE LEVER APPARATUS

CROSS-REFERENCE TO RELATED APPLICATIONS

This application claims priority under 35 U.S.C. §119 to Taiwanese Patent Application No. 99205557, filed Mar. 30, 2010. The entire disclosure of Taiwanese Patent Application No. 99205557 is hereby incorporated herein by reference.

BACKGROUND

1. Field of the Invention

This invention generally relates to a bicycle brake lever apparatus. More specifically, the present invention relates to a technique useful when filling a hydraulic brake system for replacing the hydraulic fluid such that it is easy for residual gas bubbles during the replacement of a hydraulic fluid to retreat from a cylinder to a fluid reservoir and further prevents the backflow of the retreated gas bubbles.

2. Background Information

Disc brakes for bicycles typically include hydraulic brakes and mechanical brakes. In the case of a hydraulic brake, when filling the hydraulic brake system for the replacement of the hydraulic fluid, gas bubbles may enter into the fluid reservoir. Typically, the hydraulic brake system must be bled after the replacement of the hydraulic fluid in order to remove the gas bubbles from the system. With the gas bubbles existing in the fluid reservoir, if the bicycle should fall aside in an accident, for example, the gas bubbles will likely enter into the cylinder. Furthermore, for the fluid reservoir, it is desirable that the volume of a diaphragm in the fluid reservoir changes smoothly while ensuring the volume of the hydraulic fluid chamber within the fluid reservoir.

SUMMARY

In view of the state of the known technology, there exists a need for a brake lever apparatus for a bicycle that prevents gas bubbles from entering into the cylinder. The hydraulic brake lever apparatus disclosed herein has been developed to address the aforementioned need. One object of this disclosure is to provide a hydraulic brake lever apparatus for a bicycle that is easy for gas bubbles in a cylinder to retreat to a fluid reservoir during the filling and replacement of a hydraulic fluid and further prevents the retreated gas bubbles from flowing back to the cylinder.

According to a first aspect of the present disclosure, a hydraulic brake lever apparatus is provided for a bicycle that basically comprises a brake lever housing, a piston, a mounting structure, a brake lever, a fluid reservoir and a diaphragm. The brake lever housing includes a cylinder. The piston is movably disposed within the cylinder of the brake lever housing. The mounting structure is configured to mount the brake lever housing to a bicycle handlebar. The brake lever is pivotally mounted to the brake lever housing and arranged to move the piston within the cylinder in response to pivotal movement of the brake lever relative to the brake lever housing. The fluid reservoir is in fluid communication with the cylinder via a port that communicates hydraulic fluid therebetween. The fluid reservoir has a cylindrical shape and lies in a side by side relationship with the cylinder.

With the bicycle brake lever apparatus of the present disclosure, since the fluid reservoir is in fluid communication with the cylinder via the port for communicating the hydraulic fluid, and the fluid reservoir lies in a side by side relationship with the cylinder, the backflow of the gas bubbles having retreated from the cylinder to the fluid reservoir via the port can be prevented.

Preferably, in the bicycle brake lever apparatus, the fluid reservoir includes a cylindrical portion, an open end portion located at a first end of the cylindrical portion and a conical end portion located at a second end of the cylindrical portion that is nearest to the cylinder. In this case, since the conical end portion of the fluid reservoir is located at the part of the cylindrical portion that is nearest to the cylinder, it is even more difficult for the gas bubbles once retreated to the fluid reservoir to flow back to the cylinder.

Preferably, in the bicycle brake lever apparatus, the port is positioned adjacent a tip of front of the conical end portion of the fluid reservoir. In this case, during the replacement of the hydraulic fluid, residual gas bubbles always retreat to the fluid reservoir via the port. Even in the case that the bicycle accidentally falls aside, the gas bubbles in the fluid reservoir never flow back to the cylinder. Thus, a good braking control can be maintained.

Preferably, in the bicycle brake lever apparatus, the apparatus further comprises a removable cap closing the open end portion of the fluid reservoir. In this case, leakage of the hydraulic fluid from the open end portion can be prevented.

Preferably, in the bicycle brake lever apparatus, the apparatus further comprises a diaphragm disposed within the fluid reservoir. In this case, since the diaphragm having a variable volume is disposed within the fluid reservoir, the hydraulic fluid can be smoothly supplemented to the hydraulic lines.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
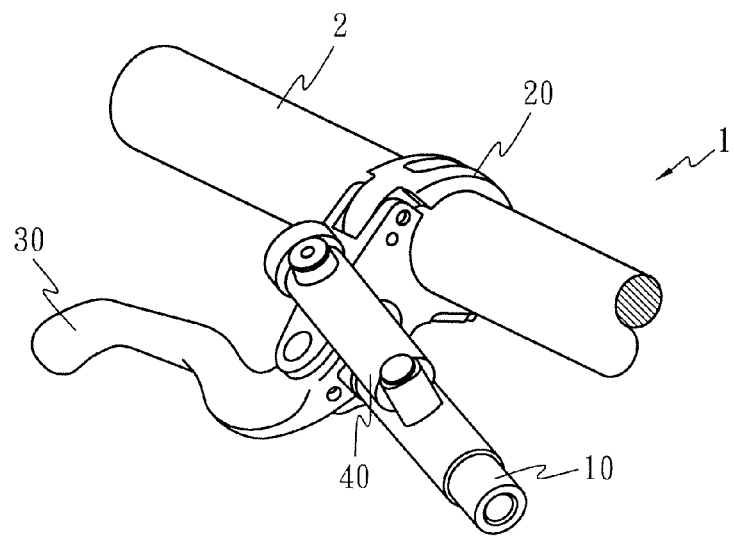
FIG. 1 is a perspective view of a hydraulic brake lever apparatus in accordance with one embodiment that is mounted on a handlebar.
Figure 2:
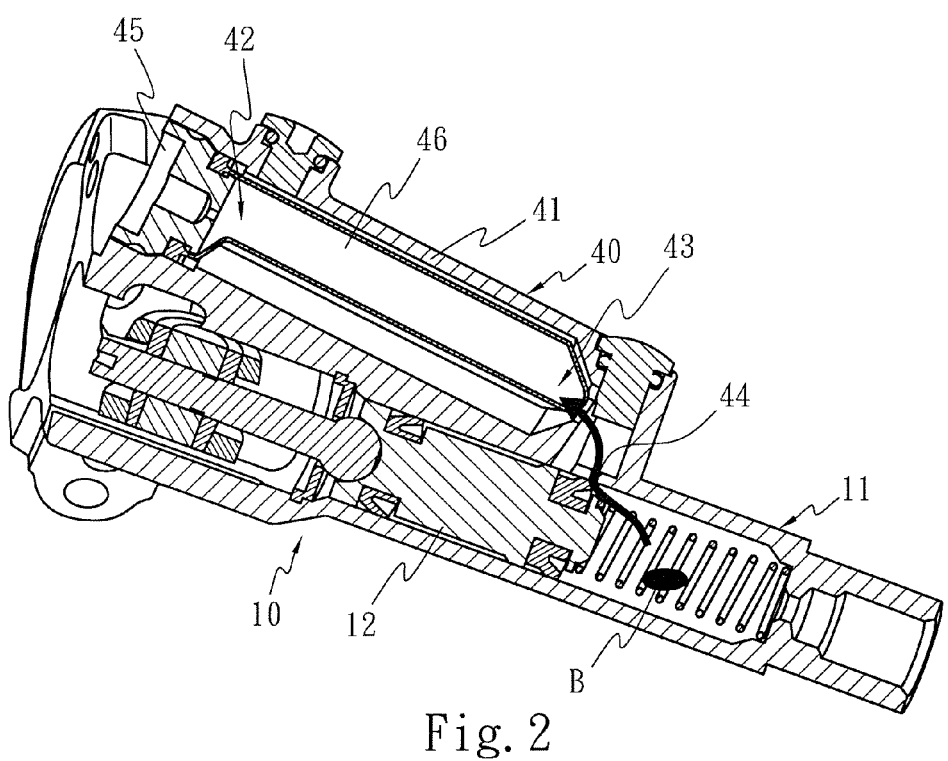
FIG. 2 is a cross sectional view of selected main parts of the hydraulic brake lever apparatus illustrated in FIG. 1.

Referring initially to FIGS. 1 and 2, a hydraulic brake lever apparatus 1 is illustrated in accordance with one embodiment.

The hydraulic brake lever apparatus 1 is especially useful in a bicycle. The hydraulic brake lever apparatus 1 is typically mounted to a bicycle handlebar 2. As shown in FIGS. 1 and 2, the hydraulic brake lever apparatus 1 includes a brake lever housing 10 having a cylinder 11. A piston 12 is movably disposed within the cylinder 11. The hydraulic brake lever apparatus 1 further includes a mounting structure or assembly 20 for mounting the brake lever housing 10 to the handlebar 2. The hydraulic brake lever apparatus 1 further includes a brake lever 30 that is pivotally mounted to the brake lever housing 10 for moving the piston 12. The brake lever housing 10 of the hydraulic brake lever apparatus 1 further includes a fluid reservoir 40 in fluid communication with the cylinder 11 via a port 44 for communicating a hydraulic fluid F. The fluid reservoir 40 has a cylindrical shape and is laid abreast (i.e., alongside each other) with the cylinder 11. In other words, the fluid reservoir 40 and the cylinder 11 are arranged side by side within the brake lever housing 10.

While the hydraulic brake lever apparatus 1 is mounted to the handlebar 2 by the mounting assembly 20, pulling the brake lever 30 backward causes the piston 12 to move in the cylinder 11 and to force the hydraulic fluid F out of the cylinder 11, thereby performing a frictional braking operation. Furthermore, as shown in FIG. 2, the fluid reservoir 40 includes a cylindrical portion 41, an open end portion 42 and a conical end portion 43. The open end portion 42 is located at one end of the cylindrical portion 41. The conical end portion 43 is located at a part of the cylindrical portion 41 that is nearest to the cylinder 11.

The brake lever housing 10 further includes the port 44 that is provided for communicating the hydraulic fluid F between the cylinder 11 and the fluid reservoir 40. In other words, the port 44 enables the fluid communication between the cylinder 11 and the fluid reservoir 40 such that hydraulic fluid F can flow between the cylinder 11 and the fluid reservoir 40. The port 44 is positioned in front of the conical end portion 43 of the fluid reservoir 40 such that the port 44 fluidly connects the conical end portion 43 of the fluid reservoir 40 to the cylinder 11. In other words, the port 44 is positioned adjacent a tip of the conical end portion 43 of the fluid reservoir 40.

Also, as shown in FIG. 2, the fluid reservoir 40 is provided with a cap 45 that is configured to close the open end portion 42 of the fluid reservoir 40. The cap 45 is removable from and reinstallable into the open end portion 42 of the fluid reservoir 40 without damaging the cap 45. A diaphragm 46 is inserted into the interior of the fluid reservoir 40. The diaphragm 46 has a variable volume with respect to the fluid reservoir 40. In other words, the diaphragm 46 is a resilient member that can elastically deform to effectively change the effective volume consumed by the diaphragm 46 with respect to the fluid reservoir 40. Thus, the diaphragm 46 can be enlarged to decrease the effective volume of the fluid reservoir 40, or shrunken to increase the effective volume of the fluid reservoir 40.

Figure 3A:
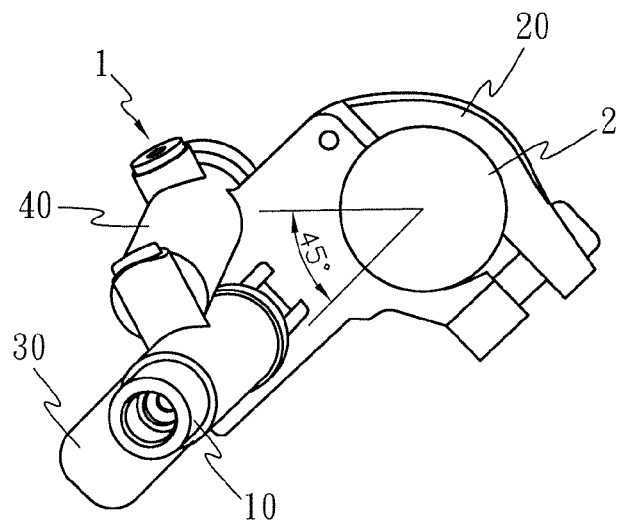
FIG. 3A is a perspective view of the hydraulic brake lever apparatus illustrated in FIGS. 1 and 2 as viewed along the handlebar mounting axis.
Figure 3B:
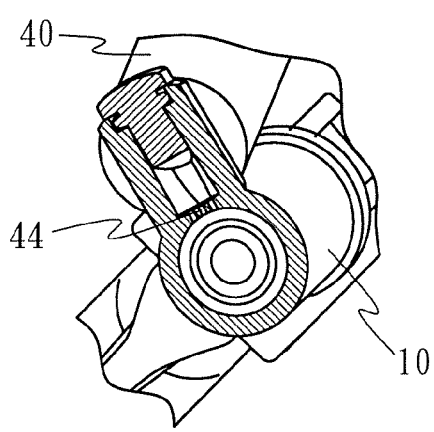
FIG. 3B is an enlarged schematic cross sectional view of a portion of the hydraulic brake lever apparatus illustrated in FIG. 3A.
Figure 4:
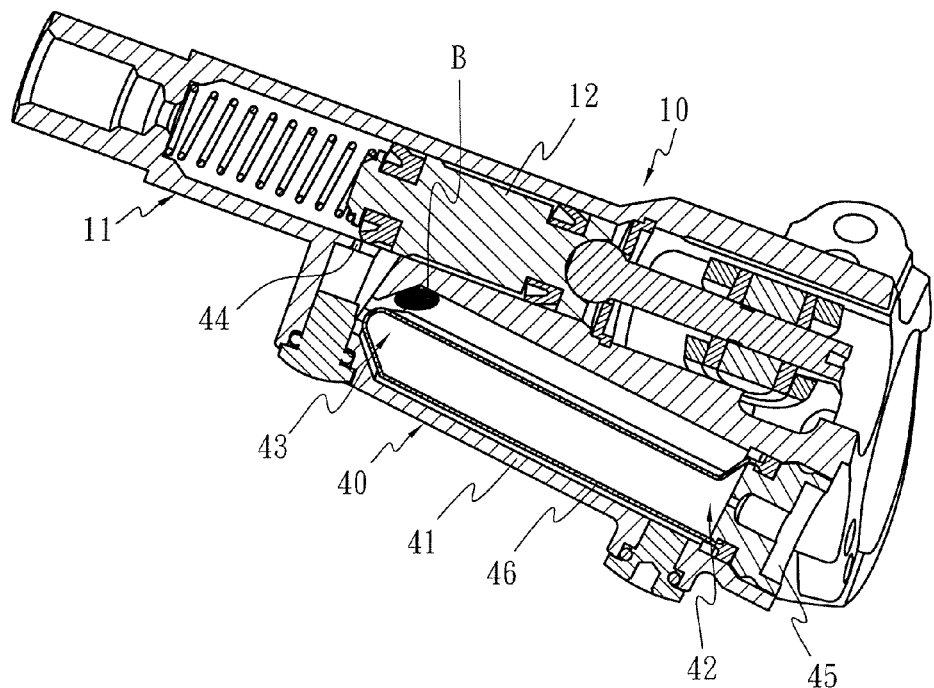
FIG. 4 is a cross sectional view of selected main parts of hydraulic brake lever apparatus showing a situation when the bicycle falls on a side.

As shown in FIGS. 3A and 3B, with the structure described above, the hydraulic brake lever apparatus 1, as a whole, is typically mounted in an orientation with respect to the handlebar 2 so as to be inclined with an angle of about 45 degrees relative to the ground. Since the opening of the port 44 via which the fluid reservoir 40 communicates with the cylinder 11 is located above the cylinder 11 in a typical installed position, a gas bubble B existing in the fluid reservoir 40 never flows back to the cylinder 11.

Furthermore, with the structure of the hydraulic brake lever apparatus 1, as shown by the arrow in FIG. 2, during the filling and replacement of the hydraulic fluid, the residual gas bubble B always retreats to the fluid reservoir 40 via the port 44. Even in the case that the bicycle accidentally falls on its side, the gas bubble B is caught inside the fluid reservoir 40 and will not flow back into the cylinder 11. Thus, a good braking control can be maintained.

Figure 5:
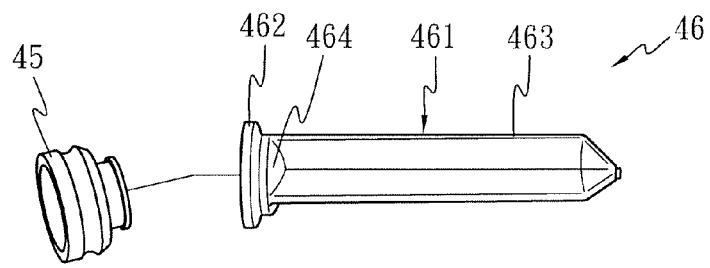
FIG. 5 is a perspective view of a diaphragm to be inserted into the fluid reservoir of the hydraulic brake lever apparatus illustrated in FIGS. 1 to 4.

Referring to FIG. 5, the structure of the diaphragm 46 inserted into the fluid reservoir 40 will now be described in greater detail. As shown in FIG. 5, the hollow and volume-variable diaphragm 46 includes an arrowhead portion 461 and an open end portion 462. The arrowhead portion 461 is substantially arrowhead-shaped. The open end portion 462 is formed at an end of the arrowhead portion 461. The arrowhead portion 461 is provided with three radial projections 463. The radial projections 463 are formed equidistantly spaced apart and extending over the entire length of the arrowhead portion 461. The projections 463 are thin vanes that are configured and arranged similar to vanes (arrow feathers) of an arrow.

The cap 45 is provide for closing off the open end portion 462 of the diaphragm 46 and for closing off the open end portion 42 of the fluid reservoir 40. If the diaphragm 46 is provided with more than three radial projections 463 that are spaced apart by an angle of 90 degrees or less, then the volume of the hydraulic fluid chamber within the fluid reservoir 40 would be reduced. On the other hand, if the radial projections 463 of the diaphragm 46 are spaced apart by an angle of 180 degrees or with unequal angles, then a smooth change of the volume of the diaphragm 46 would be hindered. Thus, in the hydraulic brake lever apparatus 1, the diaphragm 46 is preferably provided with three radial projections 463 that are equally spaced apart from one another with an angle of substantially 120 degrees. Thus, the volume of the diaphragm 46 changes smoothly while ensuring the volume of the hydraulic fluid chamber within the fluid reservoir 40.

Also, as shown in FIG. 5, a conical portion 464 is provided at an open end portion (a root portion) of the arrowhead portion 461 between each of two adjacent ones of the radial projections 463. By providing the conical portions 464, the impairment of the diaphragm 46 occurring during its volume change can be reduced.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the hydraulic brake lever apparatus. Accordingly, these terms, as utilized to describe the hydraulic brake lever apparatus should be interpreted relative to a bicycle equipped with the hydraulic brake lever apparatus as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic brake lever apparatus comprising:
    a brake lever housing including a cylinder, the cylinder having a central axis;
    a piston movably disposed within the cylinder of the brake lever housing;
    a mounting assembly configured to mount the brake lever housing to a bicycle handlebar;
    a brake lever pivotally mounted to the brake lever housing and arranged to move the piston within the cylinder in response to pivotal movement of the brake lever relative to the brake lever housing; and
    a fluid reservoir in fluid communication with the cylinder via a port that communicates hydraulic fluid therebetween, the fluid reservoir having a cylindrical shape and lying in a side by side relationship with the cylinder, such that the fluid reservoir includes a cylindrical portion, an open end portion located at a first end of the cylindrical portion and a conical end portion located at a second end of the cylindrical portion that is nearest to the cylinder, the conical end portion of the fluid reservoir being closer than the open end portion to a first longitudinal end of the cylinder, and the open end portion being closer than the conical end portion to a second longitudinal end of the cylinder, and
    the cylinder and the fluid reservoir being positioned relative to the mounting assembly to locate the fluid reservoir above the cylinder with the mounting assembly in an installed position, the cylindrical shape of the fluid reservoir extending non-perpendicularly with respect to the central axis of the cylinder.

2. The hydraulic brake lever apparatus according to claim 1, wherein
    the port is positioned adjacent a tip of front of the conical end portion of the fluid reservoir.

3. The hydraulic brake lever apparatus according to claim 2, further comprising
    a removable cap closing the open end portion of the fluid reservoir.

4. The hydraulic brake lever apparatus according to claim 2, further comprising
    a diaphragm disposed within the fluid reservoir.

5. The hydraulic brake lever apparatus according to claim 1, further comprising
    a removable cap closing the open end portion of the fluid reservoir.

6. The hydraulic brake lever apparatus according to claim 5, further comprising
    a diaphragm disposed within the fluid reservoir.

7. The hydraulic brake lever apparatus according to claim 1, further comprising
    a diaphragm disposed within the fluid reservoir.

8. The hydraulic brake lever apparatus according to claim 1, further comprising
    a diaphragm disposed within the fluid reservoir.

9. The hydraulic brake lever apparatus according to claim 1, wherein
    the mounting assembly has a central axis, and a plane including the central axis of the cylinder and the central axis of the mounting assembly does not intersect the fluid reservoir.

10. The hydraulic brake lever apparatus according to claim 1, wherein
    the fluid reservoir has a central axis extending axially through the cylindrical shape of the fluid reservoir, the central axis of the fluid reservoir not intersecting with the piston with the mounting assembly in the installed position.

* * * * *